(12) United States Patent
Alcazar Jorba et al.

(10) Patent No.: US 9,012,522 B2
(45) Date of Patent: Apr. 21, 2015

(54) FOAMS OF GRAPHENE, METHOD OF MAKING AND MATERIALS MADE THEREOF

(75) Inventors: Daniel Alcazar Jorba, Remich (LU); Edwin Lorimer Thomas, Houston, TX (US)

(73) Assignee: Massachusetts Institute of Technology, Cambridge, MA (US)

( * ) Notice: Subject to any disclaimer, the term of this patent is extended or adjusted under 35 U.S.C. 154(b) by 427 days.

(21) Appl. No.: 13/517,751

(22) Filed: Jun. 14, 2012

(65) Prior Publication Data

US 2012/0322917 A1 Dec. 20, 2012

Related U.S. Application Data

(60) Provisional application No. 61/497,147, filed on Jun. 15, 2011.

(51) Int. Cl.

| | |
|---|---|
| *B01F 3/04* | (2006.01) |
| *C01B 31/00* | (2006.01) |
| *C01B 31/04* | (2006.01) |
| *B82Y 30/00* | (2011.01) |
| *B82Y 40/00* | (2011.01) |

(52) U.S. Cl.
CPC ......... *C01B 31/0438* (2013.01); *C01B 31/0484* (2013.01); *B82Y 30/00* (2013.01); *B82Y 40/00* (2013.01); *C01B 31/043* (2013.01)

(58) Field of Classification Search
USPC ........ 516/10, 11, 15; 977/737, 740, 741, 745, 977/748, 749
See application file for complete search history.

(56) References Cited

U.S. PATENT DOCUMENTS

| | | | | |
|---|---|---|---|---|
| 8,147,791 | B2 * | 4/2012 | Gilje | ............................ 423/448 |
| 2010/0237296 | A1 | 9/2010 | Gilje | |
| 2013/0230709 | A1 * | 9/2013 | Zhou et al. | .................... 428/219 |

FOREIGN PATENT DOCUMENTS

EP 2 256 087 A1 12/2012

OTHER PUBLICATIONS

International Preliminary report on Patentability PCT/US2012/042637 mailed on Jan. 3, 2014.
Folke Johannes Tolle, et al., Emulsifier-Free Graphene Dispersions with high Graphene Content for Printed Electronics and Freestanding Graphene Films, Advanced Functional Materials, Mar. 21, 2012, pp. 1136-1144, vol. 22-No. 6, Wiley-VCH Verlag GMBH & Co. KgaA, Weinham.
A. Saint-Jalmes, D.J. Durian, D.A. Weitz. Foams. In: Kirk-Othmer Encyclopedia of Chemical Technology (2004) and D. Weaire, S. Hutzler. The Physics of Foams. Oxford University Press (1999).
T. Tadros. Surfactants. In: Kirk-Othmer Encyclopedia of Chemical Technology (2006) and D. Myers. Surfactant Science and Technology. Wiley-Interscience (2006).
M.S. Fuhrer, C. Ntng Lau, A.H. MacDonald, MRS Bulletin 35, 289 (2010).
G.R. Hennig. Progress in Inorganic Chemistry 1, 125 (1959).
Stankovich, et al., Graphene-based composite materials, Nature, 442, 282 (2006).
Wilson et al., ACS Nano 3, 2547 (2009).
Boehm et al. Seitschrift fuer Anorganische und allgemeine Chemie 316, 119 (1962).
W. Stober et al. J Colloid Science, 26(1), 62-69 (1968).
S. Simovic and C. Prestioge, Langmuir 19(9), 3785-3792 (2003).
S.H. Lid, Adv. Funct. Mater. 17, 3147-3152 (2007).
The International Search report and Written Opinion issued in Connection with International Patent Application No. PCT/US2012/042637 mailed on Nov. 28, 2012.
O.C. Compton et al.; graphene Oxide, Highly Reduced Graphene Oxide, and Graphene: Versatile Building Blocks for Carbon-Based Materials, SMALL, vol. 6, No. 6, Mar. 11, 2010, pp. 711-723.

* cited by examiner

*Primary Examiner* — Michael J Feely
(74) *Attorney, Agent, or Firm* — Sam Pasternack; MIT Technology Licensing Office (57) ABSTRACT

Method for making a liquid foam from graphene. The method includes preparing an aqueous dispersion of graphene oxide and adding a water miscible compound to the aqueous dispersion to produce a mixture including a modified form of graphene oxide. A second immiscible fluid (a gas or a liquid) with or without a surfactant are added to the mixture and agitated to form a fluid/water composite wherein the modified form of graphene oxide aggregates at the interfaces between the fluid and water to form either a closed or open cell foam. The modified form of graphene oxide is the foaming agent.

22 Claims, 12 Drawing Sheets

FOAMS OF GRAPHENE, METHOD OF MAKING AND MATERIALS MADE THEREOF

This application claims priority to provisional application No. 61/497,147 filed on Jun. 15, 2011, the contents of which is incorporated herein by reference.

This invention was made with government support under Grant No. DMR-0804449, awarded by the National Science Foundation. The government has certain rights in this invention.

BACKGROUND OF THE INVENTION

This invention relates to a method for making a liquid foam of graphene. More particularly, this invention describes such a method that modifies graphene oxide in water to generate a liquid foam wherein the modified form of graphene oxide is the foaming agent. The invention is also the liquid foam itself. Other objects of the invention include materials made with the liquid foam of graphene such as composites, porous networks and solid cellular foams, [D. Alcazar. Liquid Foams of Graphene. PhD Thesis Massachusetts Institute of Technology (2012).] [Liquid Foams of Graphene, D. Alcazar, L Gibson and E. L. Thomas, submitted to Science, June, 2012].

Liquid foams are dispersions of bubbles in a liquid. Most liquid foams are based on surfactant agents. [A. Saint-Jalmes, D. J. Durian, D. A. Weitz. Foams. In: Kirk-Othmer Encyclopedia of Chemical Technology (2004) and D. Weaire, S. Hutzler. The Physics of Foams. Oxford University Press (1999).] To make aqueous foams, typical surfactants are amphiphilic molecules made of hydrophilic and hydrophobic parts combined into linear or branched chain molecular structures. [T. Tadros. Surfactants. In: Kirk-Othmer Encyclopedia of Chemical Technology (2006) and D. Myers. Surfactant Science and Technology. Wiley-Interscience (2006).] There is no prior art of as liquid foam made with a foaming agent having a sheet molecular structure.

Figure 1:
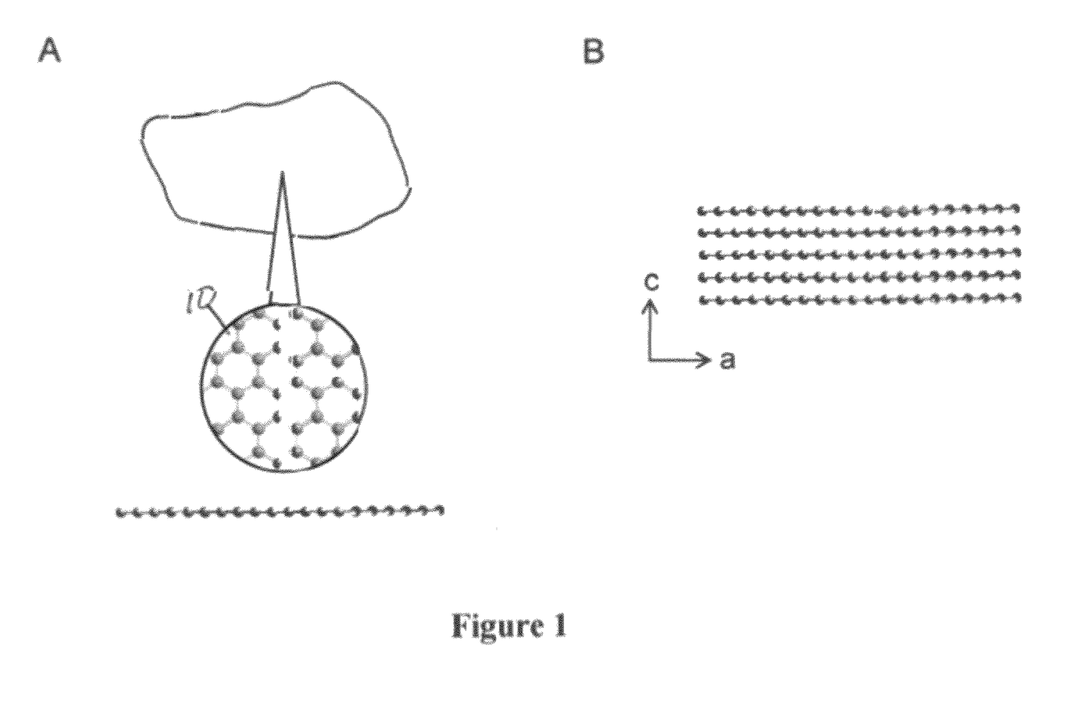
FIG. 1(A) is a schematic of the sheet molecular structure of graphene with magnified views of the arrangement of carbon atoms, top-view (top) and edge-view (bottom).
FIG. 1(B) is a layered structure of graphene sheets in graphite as seen along the [1,2,0] zone axis.
FIG. 1(C) is a schematic illustration of a sheet of graphene.
FIG. 1(D) is a schematic illustration of graphene oxide.
FIG. 1(E) is a schematic illustration of isophorone diamine-treated graphene oxide.

Graphite is a layered material made of graphene molecules. Graphene is a one atom thick molecular sheet made, primarily, of $sp^2$-hybridized carbon atoms where each carbon is bonded to three other carbons as shown in FIGS. 1(A) and 1(C). Graphene molecules are non-stoichiometric; they present a distribution of compositions, hence molecular weights, sizes and shapes. Therefore, the compositions of graphene and graphene derivatives are characterized in terms of average parameters such as the relative amounts of oxygen and carbon atoms, or the relative amounts of functional groups.

As used in this patent application, graphene oxide sheets have a heterogeneous chemical composition of fractional ratios of graphene and functionalized graphene regions as shown in FIG. 1(D). IPDA-treated graphene oxide is defined as treatment of graphene oxide with isophorone diamine (IPDA). The resulting material has increased graphene content as can be seen in FIG. 1(E). Other reducing agents (such as other amines) may be used.

An object of this invention is a liquid foam made with a foaming agent having a sheet molecular structure. In particular, the invention is such a liquid foam where air bubbles are encapsulated inside graphene shells and the shells are made of a modified form of graphene oxide. The modified form of graphene oxide is the foaming agents in such liquid foams of graphene.

Graphene has a unique combination of electrical, mechanical and barrier properties. [M. S. Fuhrer, C. Ning Lau, A. H. MacDonald. MRS Bulletin 35, 289 (2010).] This makes graphene a potentially competitive additive in the composite market, for example, in market segments where additives such as carbon blacks, carbon fibers and carbon nanotubes are currently in use. Therefore, the use of graphene as an additive for composites is desirable. In many applications it is desirable for the graphene to form a continuous phase or percolating network throughout a composite matrix, resulting in advantageous electrical conductivity of the composite and mechanical enhancement of the composite.

One way of using graphene as an additive in polymeric composites, for example, involves exfoliating graphene from its parent graphite and dispersing the exfoliated graphene in a polymeric matrix. Oxidation has been proposed as a scalable route to exfoliating graphite. The resulting graphite oxide is made of graphene oxide sheets, a form of graphene where oxygenated functional groups are covalently attached to the carbon atoms in the sheets as shown in FIG. 1(D). Graphite oxide readily exfoliates in water into stable dispersions of graphene oxide. [G. R. Hennig. Progress in Inorganic Chemistry 1, 125 (1959)] Graphene oxide, however, has poor electrical conductivity and it is likely to be more mechanically flexible than graphene. In order to have exfoliated graphene that has been dispersed in a polymeric matrix have sufficient electrical conductivity to avoid static charge buildup and to enhance mechanical stiffness and strength, for example, it is necessary to reduce graphene oxide to graphene.

Exfoliated graphene oxide dispersions have excellent stability in water. Therefore, reduction in an aqueous solution is preferable in order to maintain a high degree of exfoliation. However, the prior art for reducing graphene oxide in water has several shortcomings. Prior art techniques have made use of hazardous chemicals such as hydrazine that are not suitable components for composite formulations. Further, the aggregation of graphene oxide after it has been reduced often requires the use of stabilizers such as surfactants to minimize such aggregation. Filtration steps may also be required. Other drawbacks include the use of organic solvents, the use of sonication steps and the use of high temperatures.

An object of the present invention is a better process to reduce graphene oxide in water and to enable transfer of the resulting reduced graphene oxide out of the water phase to a polymeric resin phase. The present invention improves the current state of the art for reducing graphene oxide for subsequent manufacturing composites.

Porous materials are used in a multitude of applications, for example, as light weight separation media in filters and as support media in catalysis. An object of the present invention is an improved method to produce porous materials made of a modified form of graphene oxide.

Another object of the present invention is a method to prepare a solid cellular foam made by drying the liquid foam of graphene. The invention is also the solid foam itself. Such foam presents a closed-cell structure made by packing dried graphene shells. Such material is of interest as lightweight structure. Moreover, this solid graphene foam can act as a functional material given the ability of the graphene shells to encapsulate a fluid/gas and further release the liquid/gas cargo by action of a trigger such as by heating or by mechanical compression.

Yet another object of the invention is a method for making open cell foams that can be infiltrated with various materials such as sol-gels that are converted to ceramics, and monomers that can be polymerized to a polymer or crosslinked polymer network. It is contemplated that a second nonmiscible liquid be added to the water phase and to agitate the material to create a liquid/liquid closed or open cell foam to entrap either liquid.

SUMMARY OF THE INVENTION

The method of the invention for making a liquid foam of graphene includes preparing an aqueous dispersion of graphene oxide and adding a water miscible compound to the aqueous dispersion of graphene oxide to produce a mixture including a modified form of graphene oxide. Then an excess of water is added to the mixture, and the mixture is then agitated to produce a foamed phase with the modified form of graphene oxide as the foaming agent. In a preferred embodiment, the water miscible compound is a base, for example a diamine such as isophorone diamine. It is also preferred that the resulting foam be removed from the mixture by skimming or by gravitational separation. In another aspect, the invention is a liquid foam of graphene including a modified form of graphene oxide encapsulating air (or another liquid or fluid) to form a foam. In such liquid foam, the modified form of graphene oxide is the foaming agent that stabilizes the air (or other fluid) bubbles by encapsulating them inside shells. In another aspect, the invention is a liquid foam of graphene resulting from the process of the invention.

The present invention provides a method for manufacturing liquid foams containing reduced graphene oxide from aqueous graphene oxide dispersions. In such liquid foams, the reduced form of graphene oxide is the foaming agent. Moreover, such liquid foams made according to the invention have excellent characteristics for the production of composites, porous materials and solid open and closed cellular foams containing reduced graphene oxide.

In another preferred embodiment, such liquid foam of graphene containing a modified form of graphene oxide is used to prepare a composite material. A preferred embodiment of this aspect of the invention is the composite matrix being a polymeric material such as an epoxy. In another aspect of this invention, the liquid foam of graphene is used to produce porous materials containing modified graphene oxide. Further, in another embodiment of this invention such liquid foam is used to prepare solid graphene foams with a closed-cell cellular structure.

It will be advantageous to make bicontinuous composites of graphene and a polymer. To do this, one needs an open cell foam or porous network of graphene. This is the case so that a second material can connect itself and surround the graphene sheets which in turn surround the infiltrated material. A suitable material for infiltration is a two component, low viscosity epoxy. Open celled foam will provide good geometries for 3-dimensional infiltration. The open cell foam may be fabricated by adding a second immiscible fluid that contains a surfactant that creates a 3D bicontinuous fluid/water structure. The graphene sheets then template this phase. There are numerous known bicontinuous surfactant-oil-water systems. If the graphene sheets are initially the water phase, they migrate to the surfactant/oil interface and thus form a 3-dimensional continuous structure. The removal of the volatile components would then result in a 3-dimensional structure that might be either open cell or closed cell depending on the relative energies of the surface interactions of the functionalized graphene sheets and component amounts with respect to the chosen surfactant.

The method to prepare composites containing graphene according to the invention has several benefits. First of all, the process avoids using organic solvents as are used in some current practices despite of the fact that in most organic solvents graphene oxide is not as well dispersed as it is in water. Moreover, organic solvent removal is required before or after mixing reduced graphene oxide with other components in composite formulations. In addition to being costly, organic solvents are a hazard to health and to the environment. The process according to the invention also avoids using filtration steps. Filtering exfoliated graphene dispersions is not scalable to large volumes. Because of the excellent barrier properties of graphene, exfoliated graphene dispersions rapidly plug filters, slowing down filtration to unprofitable rates and/or requiring vacuum systems which add to the cost. Foaming appears to be an efficient way of handling modified graphene oxide materials since such handling avoids the gross aggregation of sheets typical of processes that involve filtration steps.

The process of the invention uses a water miscible compound to modify graphene oxide, such as isophorone diamine, that also functions as both a carrier and a curing agent in the preparation of epoxy composite formulations.

Those of skill in the art will recognize that the process disclosed herein can be applied to polymeric systems other than epoxy if the appropriate combination of water miscible compound and polymer or pre-polymer resin is provided.

Methods are known to prepare porous graphene materials involving freeze-drying aqueous dispersions of graphene oxide or the high temperature exfoliation of intercalated graphites or graphite oxides. These methods that are based on freeze-drying graphene oxide require a high temperature (up to 800-1000 C), post-freeze-drying thermal treatment, for example, to reduce graphene oxide when good electrical conductivity of the resultant material is required. The present invention provides porous reduced graphene oxide materials directly after freeze-drying the liquid foam of graphene without needing any further processing step. Furthermore, this method respects the chemistry of the modified form of graphene oxide since it does not use high temperatures; hence, such a method enables to prepare porous graphene materials with selective surfaces for the detection of specific analytes or scavenging of specific contaminants, for example.

Cellular materials are used in a variety of applications due to their beneficial combination of thermal management and light weight, both aspects being critical in reducing energy consumption in transportation and housing as well as reducing customer exposure to heat generated by portable electronic devices, for example. The present invention provides a method for manufacturing a solid foam made by drying the liquid foam of graphene. Upon liquid removal, the graphene shells encapsulating the gas pack together into a closed-cell structure. Alternatively, the functional groups on the modified graphene oxide can be reacted to provide covalent bonding between the sheets or a reactive monomer can be included in the solution that aggregates to the fluid/water interface and can then be polymerized by heat, uv or the presence of an initiator. Such method enables the preparation of lightweight cellular solid foams made of modified graphene oxide. The invention is also such solid foam of modified graphene oxide itself. Another aspect of the invention is a solid foam made of reduced graphene oxide having a closed-cell cellular structure. It is contemplated as discussed above to add other ingredients to enable open cell foams and bicontinuous composites wherein the graphene structure provides the interface between the two phases and exhibits good electrical conductivity and enhances mechanical strength of the composite.

BRIEF DESCRIPTION OF THE DRAWING

FIGS. 4(A) and (B) are x-ray photoelectron spectroscopy survey spectra of (A) graphene oxide and (B) isophorone diamine modified graphene oxide, CPS: Counts per second.

FIGS. 5(A) and (B) are x-ray photoelectron spectroscopy high-resolution spectra of the C 1s region in (A) graphene oxide and (B) isophorone diamine modified graphene oxide. CPS: Counts per second.

DESCRIPTION OF THE PREFERRED EMBODIMENT

The process according to the invention begins with the preparation of an aqueous dispersion of graphene oxide. A water miscible compound is added to the aqueous dispersion of graphene oxide. The mixture is allowed to react into a new mixture containing a modified form of graphene oxide. Excess water is added to the mixture, and the mixture is agitated to entrap air. After agitation, a foamed phase separates on top of the water phase. The foamed phase contains a modified form of graphene oxide encapsulating air bubbles. The modified form of graphene oxide is the foaming agent. The foam is removed from the water surface and can then be used to manufacture composites, porous materials and solid cellular foams.

Figure 6:
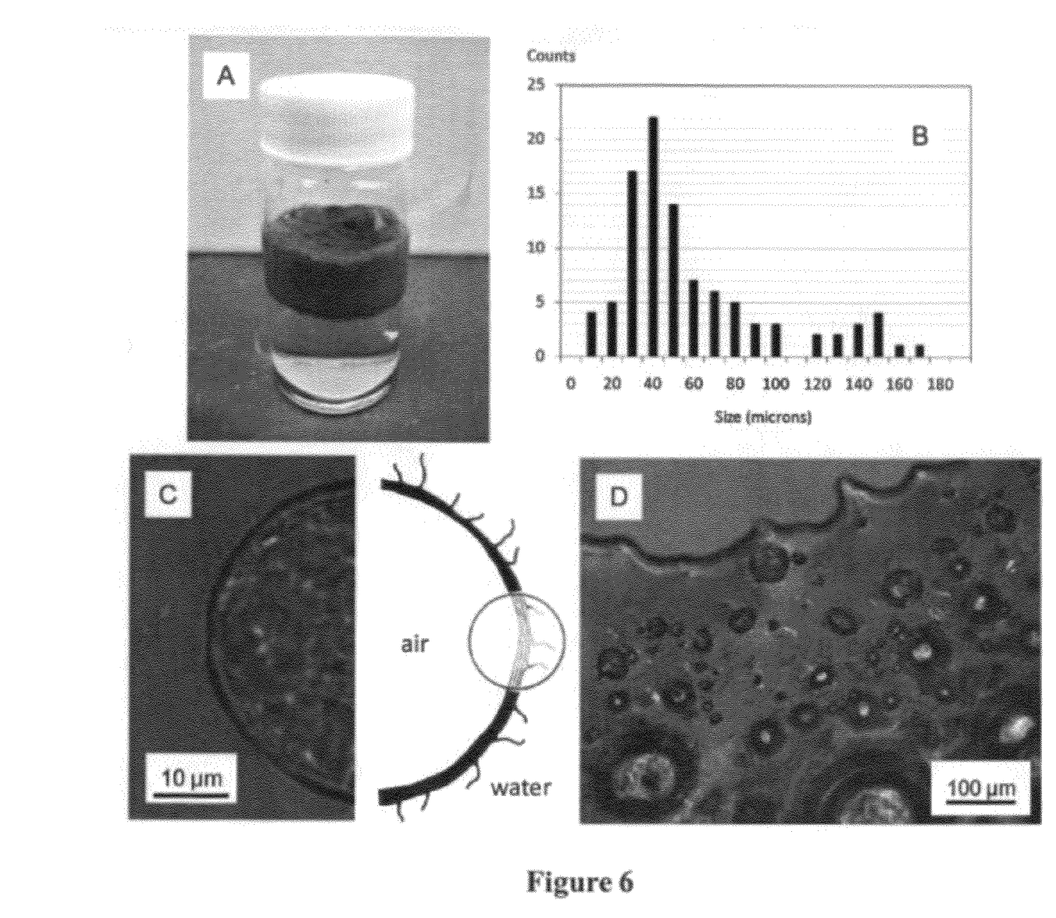
FIG. 6(A) is a magnified-view photograph of the foam in FIG. 2(C).
FIG. 6(B) is a plot showing the distribution of bubbles sizes.
FIG. 6(C) left is a transmission light microscope image of a bubble suspended in water. Right, schematic of the cross-section of the isophorone diamine modified graphene oxide shell encapsulating the air bubble.
FIG. 6(D) is a polarized transmission light microscope image of a drop of a liquid foam deposited on a glass slide. The analysis corresponds to the edge of the drop where the bubbles spread out. The featureless region on top of the image is the glass support.
Figure 7:
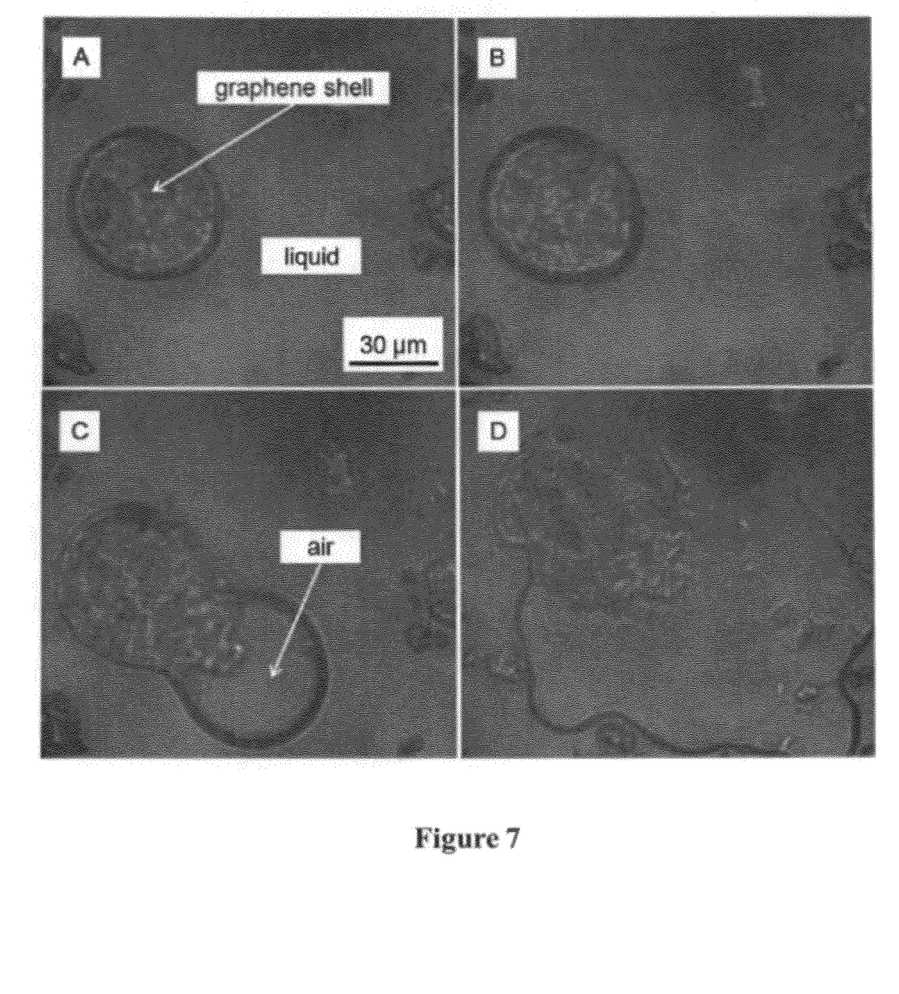
FIGS. 7(A)-(D) are transmission light microscope images of the thermal expansion by application of heat and the burst of a bubble. The graphene shell deforms and then bursts as a result of the increase in internal air pressure. The blurring of the shell contour due to optical aberration enables visualization of the changes in the thickness of the bubble during the air release process. Upon releasing the air, the dark line becomes thinner indicative of the collapse of the graphene shell.

Liquid foams made according to the invention disclosed herein are shown in FIGS. 2(C) 6(A). FIGS. 1(A) and 1(C) show a graphene sheet 10. FIG. 1(D) is graphene oxide and FIG. 1(E) is isophorone diamine-treated graphene oxide. On the left in these figures is a view normal to the plane of the sheets illustrating the heterogeneous distribution of graphene regions 12 in graphene oxide 14 and graphene regions 16 in isophorone diamine-treated graphene oxide 18. On the right side of the figures are edge-on views of the sheets indicating the types of carbon chemistries present in each one of the regions. Percentages correspond to the atomic percent of carbon atoms based on x-ray photoelectron spectroscopy analysis.

Graphene Foaming Process Example

Figure 2:
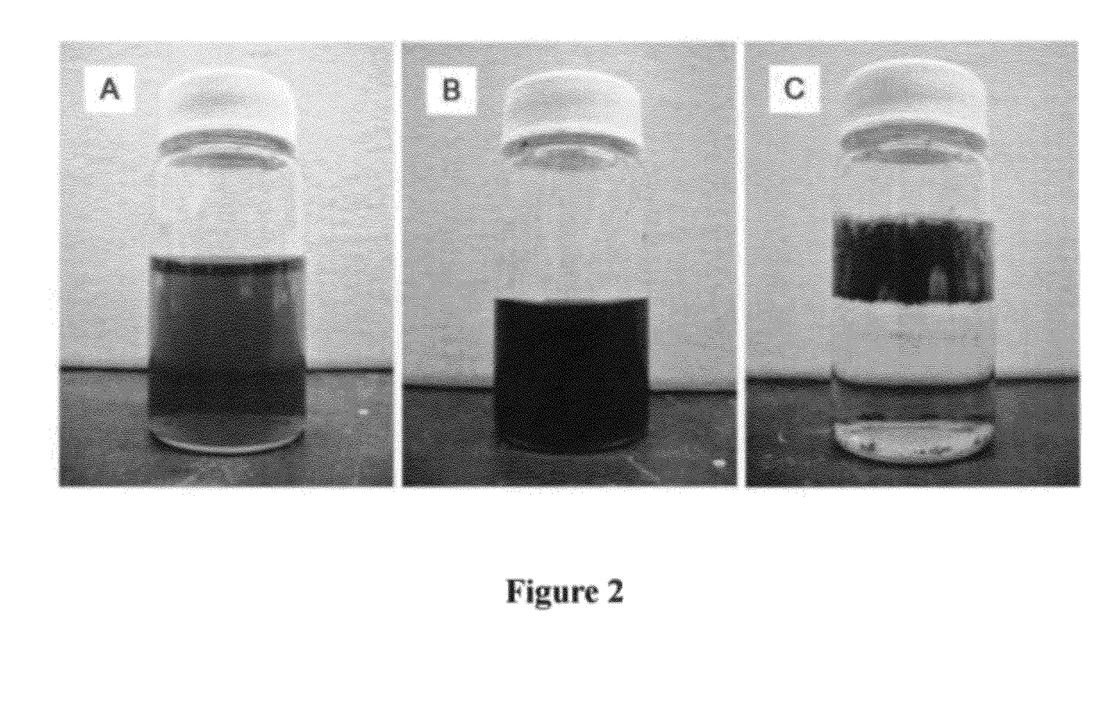
FIGS. 2(A)-(C) are photographs of graphene oxide in water (A), modified graphene oxide (B), and foam of modified graphene oxide on top of the aqueous phase (C).

This process consists of three steps: (1) preparation of graphene oxide in water, (2) modification of graphene oxide with a water miscible compound, and (3) formation of the foam containing a modified form of graphene oxide. These three steps are illustrated in FIG. 2.

1. Preparation of Graphene Oxide in Water

The procedure followed to prepare graphene oxide is known in the art as the Hummers and Offeman method. [Hummers and Offeman, Preparation of graphitic oxide, Journal of the American Chemical Society, 80, 1339 (1958).] The synthesis was conducted in an open glass reactor and using deionized water. 10 g of natural graphite flakes were added to a 400 ml 96 wt % sulfuric acid aqueous solution containing 5 g of sodium nitrate (≥99%) under stirring and cooled in an ice bath. Then 30 g of potassium permanganate (99%) were added to the mixture. After the addition of potassium permanganate, the reaction was left stirring for 2 h. Then the reactor was removed from the ice bath and immersed in a water bath at 23° C. The reaction was left under stirring for additional 4 days to a total of 5 days.

After 5 days, the reaction became a dark grey/violet paste. The paste was then added into 1 L of water containing 5 wt % of sulfuric acid. The residual permanganate was then neutralized with a 30 wt % aqueous solution of hydrogen peroxide until the mixture turned yellow. The mixture was then poured into 1 L of water containing 5 wt % of sulfuric acid and 1 wt % of hydrogen peroxide.

The product was centrifuged, the supernatant was discarded and the deposit was dissolved again in an aqueous solution containing sulfuric acid (5 wt %) and hydrogen peroxide (1 wt %). This cycle was repeated a total of 5 times. Then the same cycle was conducted using an aqueous solution containing 4 wt % of hydrochloric acid until the supernatant tested negative for sulfates. The final deposit was dissolved in deionized water to yield a 0.5 wt % solution of graphene oxide in water, FIG. 2(A). Also of possible interest is to prepare IPDA-GO with different extents of reduction. The amount of the graphene regions should depend on processing conditions (temperature/time) and the relative amounts of these respective types of regions will control the dispersability via the hydrophobicity vs. hydrophilicity of the sheets in water or other fluids.

Figure 3:
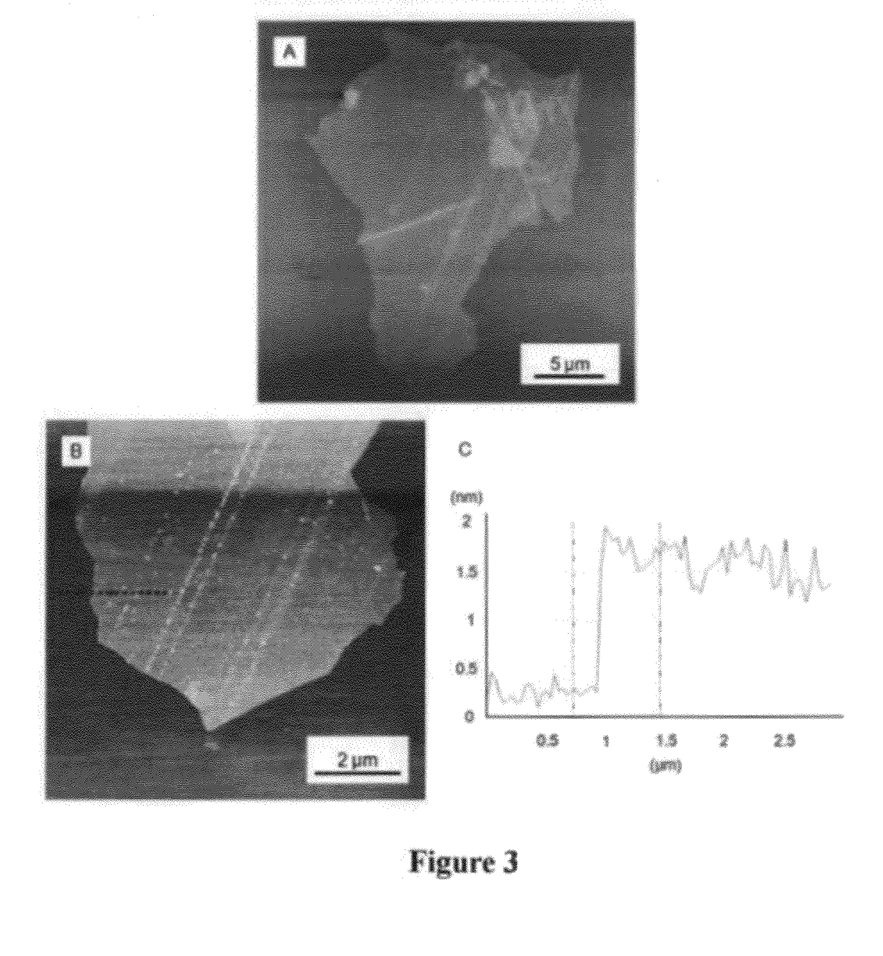
FIGS. 3(A) and (B) are atomic force microscope tapping mode images of a sheet of graphene oxide deposited on a silicon substrate.
FIG. 3(B) is a magnified image of the bottom region in A.
FIG. 3(C) is a graph showing the measured thickness of the graphene oxide sheet. Sheet thickness measurement was conducted at the edge of the sheet along the line shown in B. The thickness of the sheet is about 1 nm.
Figure 4:
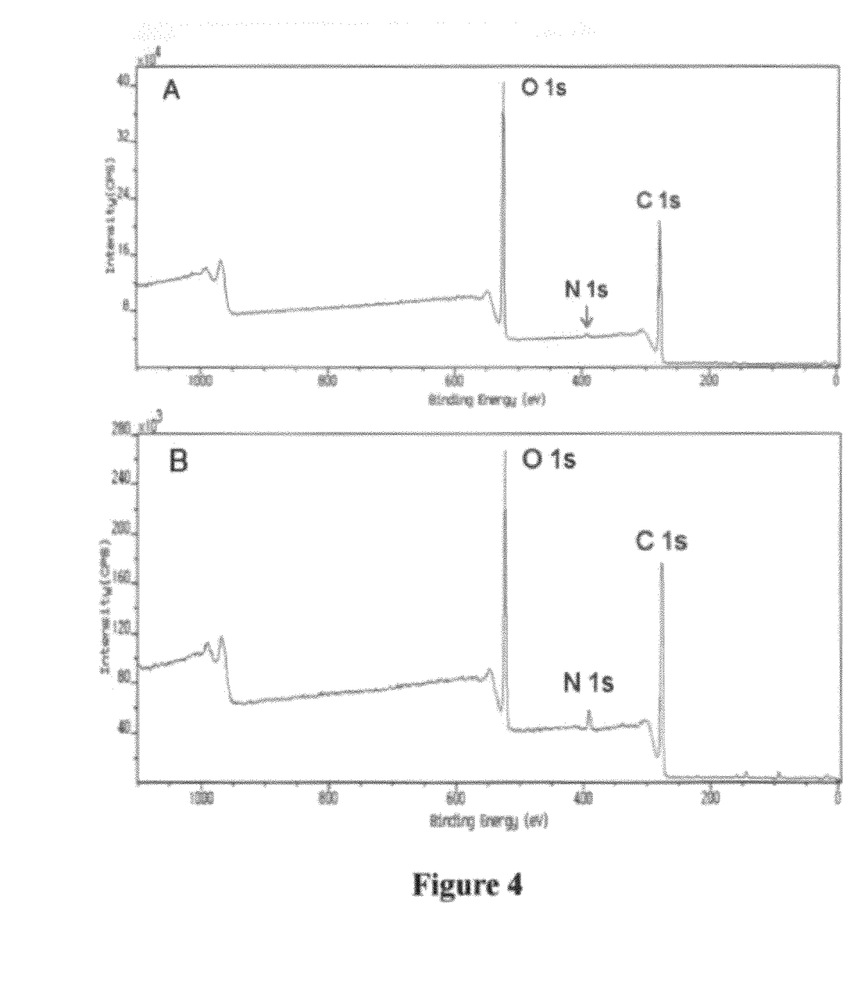
Figure 5:
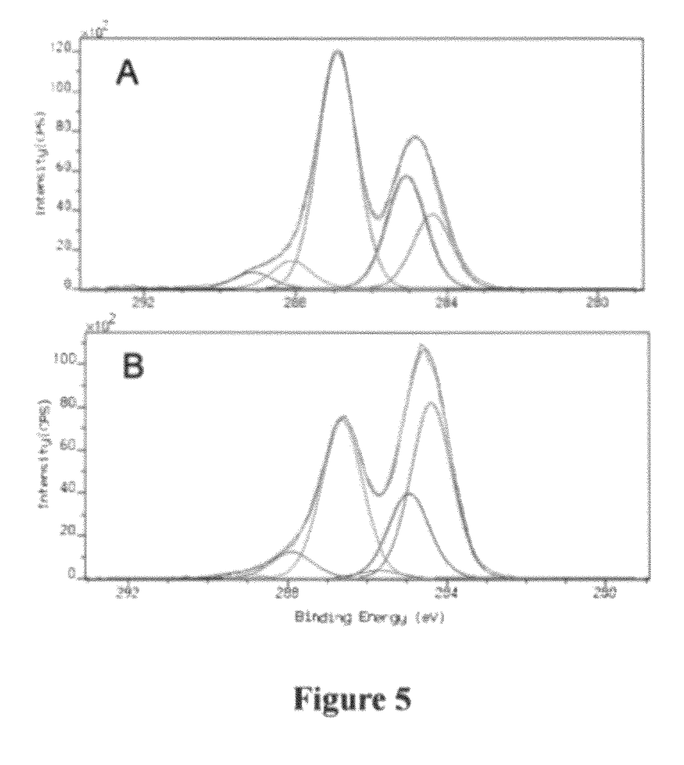

As prepared graphene oxide is present in single layer form in water as shown in FIG. 3. Sample preparation for atomic force microscopy consisted on drop casting an aliquot of the graphene oxide aqueous solution on an oxidized silicon wafer, followed by drying in a dessicator under a vacuum of 10 Pa for 24 h. It is known in the art that the thickness of monolayer graphene oxide is about 1 nm. [Stankovich, et al., Graphene-based composite materials, Nature, 442, 282 (2006).] A distribution of sheets made of multiple layers of graphene oxide may also be present together with the population of monolayer graphene oxide sheets.

2. Modification of Graphene Oxide with a Water Miscible Compound

The modification of graphene oxide was conducted with isophorone diamine (5-Amino-1,3,3-trimethylcyclohexanemethylamine, CAS #285543-2) as the water miscible compound. Equal volumes of 0.5 wt % aqueous graphene oxide and isophorone diamine (≥99%) were mixed under stirring, for example, 50 ml of 0.5 wt % aqueous graphene oxide and 50 ml of isophorone diamine (≥99%) were mixed in a glass beaker. The mixture was left under stirring for 24 hours at 23° C. The reaction darkened the mixture as illustrated in FIG. 2(B). The darkening of the product compared to the original graphene oxide solution is indicative of graphene oxide reduction towards graphene.

3. Formation of the Liquid Foam 4 ml of the product were mixed with 10 ml of deionized water. After agitation the foam spontaneously formed on top of the aqueous phase as shown in FIG. 2(C).

The chemical compositions of graphene oxide and isophorone diamine modified graphene oxide as determined by x-ray photoelectron spectroscopy analysis are reported in Tables 1 and 2. X-ray photoelectron spectroscopy analysis was conducted using Al Kα radiation (150 W, x-rays energy 1,486.7 eV) under a base pressure of $7 \times 10^{-7}$ Pa. Sample preparation for x-ray photoelectron spectroscopy analysis consisted in the following steps: aqueous dispersions of graphene oxide and isophorone diamine modified graphene oxide were dialyzed, freeze-dried and the resulting powders were then pressed into films. The films were attached to the sample holder via a double-sided conductive carbon tape.

TABLE 1

| | Atomic concentration (%) | | | C to O ratio |
|---|---|---|---|---|
| | Carbon | Oxygen | Nitrogen | C/O |
| Graphene oxide | 74.7 | 24.6 | 0.7 | 3 |
| Isophorone diamine modified graphene oxide | 78.1 | 18.8 | 3.1 | 4.1 |

TABLE 2

| Binding energy (eV) | Shift (eV) | FWHM | Atomic % | Carbon chemistry |
|---|---|---|---|---|
| GRAPHENE OXIDE | | | | |
| 284.4 | (0.7) | 1.2 | 16 | Graphene |
| 285.1 | — | 1.2 | 24.3 | Saturated hydrocarbon |
| 286.9 | 1.8 | 1.2 | 50.2 | Hydroxyl & Epoxy |
| 288.1 | 3 | 1.2 | 6 | Carbonyl |
| 289.2 | 4.1 | 1.2 | 3.5 | Carboxylic |
| ISOPHORONE DIAMINE MODIFIED GRAPHENE OXIDE | | | | |
| 284.4 | (0.6) | 1.2 | 38.2 | Graphene |
| 285 | — | 1.2 | 18.5 | Saturated hydrocarbon |
| 285.7 | 0.7 | 1.2 | 1.8 | Nitrogen |
| 286.6 | 1.6 | 1.2 | 34.5 | Hydroxyl & Epoxy |
| 287.9 | 2.9 | 1.2 | 5.8 | Carbonyl |
| 289.3 | 4.3 | 1.2 | 1.1 | Carboxylic |

Graphene oxide can contain unoxidized regions where carbon atoms retain the same chemical structure as in the original graphene sheets. These regions are labeled graphene regions and the fraction of graphene regions is defined as the graphene content of the sheets. Thus, graphene oxide has a heterogeneous chemical composition composed of graphene regions and functionalized graphene regions. Recent studies using advanced electron imaging and diffraction analysis of graphene oxide supports this heterogeneous composition of the sheets. [Wilson et al. *ACS Nano* 3, 2547 (2009)] The chemical analysis of isophorone diamine modified graphene oxide shows it is a chemically modified form of graphene oxide. Furthermore, such chemical modification involves the reduction of graphene oxide as measured in terms of an increase in the graphene content in isophorone diamine modified graphene oxide (38.2 atomic %) compared to graphene oxide (16 atomic %) as shown in FIGS. 1(D) and 1(E). The reduction of graphene oxide by means of alkaline compounds is known in the art. [Boehm et al. *Zeitschrift fuer Anorganische und Allgemeine Chemie* 316, 119 (1962).] Isophorone diamine provides the alkaline condition that reduces graphene oxide. A 10 wt % aqueous solution of isophorone diamine has a pH of 12.

A liquid foam forms upon agitating an aqueous mixture containing isophorone diamine modified graphene oxide, it is contemplated to aerate with monodisperse air bubbles or other gases or other fluids. Air bubbles are encapsulated inside graphene shells as shown in FIG. 6(C). The shells have a layered structure made of at least one isophorone diamine modified graphene oxide sheet forming a barrier that is impermeable to air. The filaments protruding from the shell surface are attributed to folds in the sheets or edge-regions of the sheets as illustrated in the magnified portion of the cross-section schematic depicting two folds and one edge-region in between the folds. The bubbles present a distribution of shapes and sizes. Most bubbles have spheroidal or ellipsoidal shapes. The dispersion of bubbles sizes is shown in the histogram in FIG. 6(B). Over a population of 100 bubbles, sizes ranged from 4 μm to 164 μm with an average size of 55 μm. Liquid foams preparations with different distributions of bubbles sizes may be possible by engineering factors such as, but not only, the size and surface chemistry of the isophorone diamine-modified graphene oxide sheets and/or the size of the bubbles generated during the foaming process.

Upon heating a bubble (by focusing light), the thermal expansion of the air inside the bubble causes a deformation of the shell. As the heating continues, the pressure builds and the shell eventually ruptures releasing the encapsulated air as shown in the sequence of images in FIGS. 7(A) to (D). Sample preparation consisted in sandwiching an aliquot of the liquid foam between glass slides.

Figure 8:
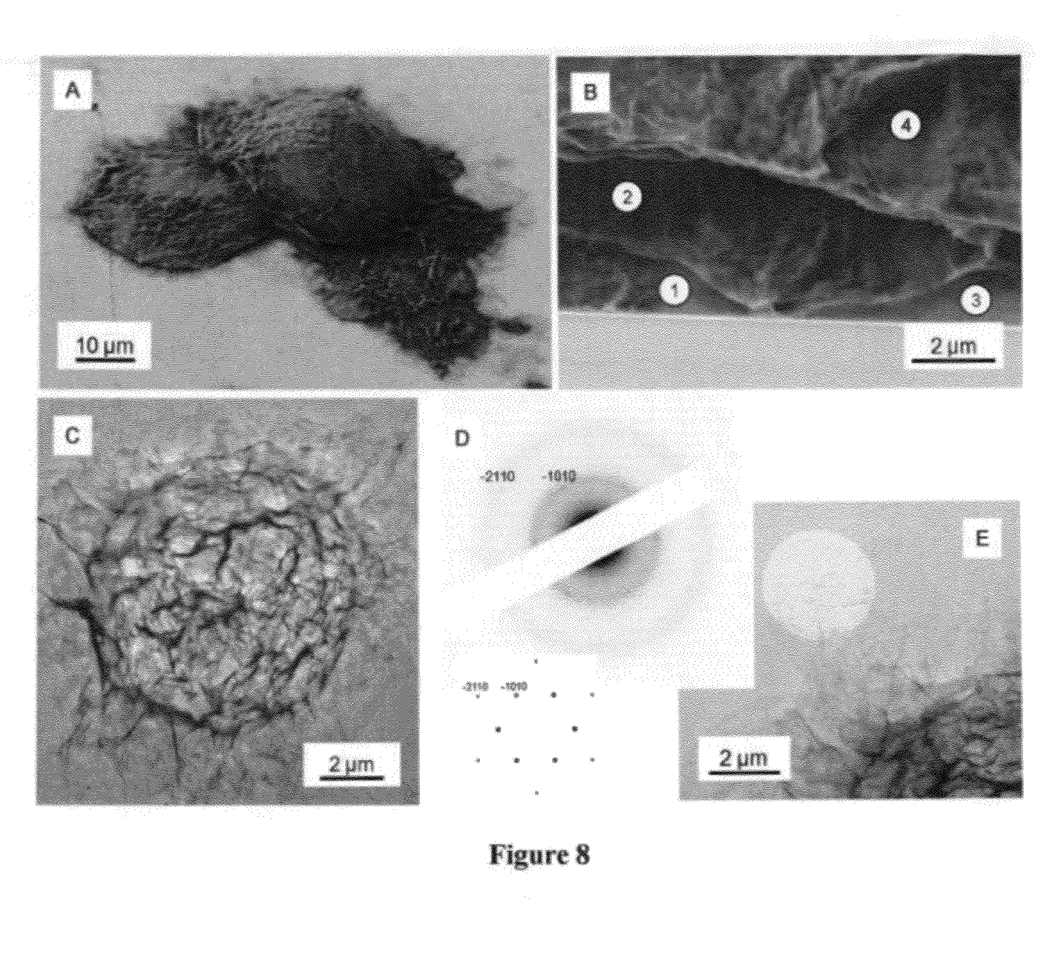
FIG. 8(A) is a scanning electron microscope image of a cluster of graphene shells obtained by drying an aliquot of the liquid foam.
FIG. 8(B) is a scanning electron microscope image of a freeze-fractured cluster of graphene shells. The fracture exposes the interiors of 4 shells.
FIG. 8(C) is a bright-field transmission electron microscope image of a graphene shell. Edge-regions of the shell-forming sheets are seen flat on the substrate around the shell.
FIG. 8(D) is a single-crystal electron diffraction pattern from an edge-region of a shell-forming sheet. The diffuse rings come from the amorphous carbon film support.
FIG. 8(E) is a bright-field transmission electron microscope image highlighting the area selected in the diffraction analysis.

FIG. 8(A) shows a scanning electron microscope image of a cluster of dried graphene shells. The scanning electron microscope was operated with an acceleration voltage of 5 kV and in secondary electrons imaging mode. Specimens were attached to the sample holder via a double-sided conductive carbon tape. Sample preparation consisted in depositing an aliquot of the foam on a gold coated glass slide. Then the sample was dried in a dessicator under a vacuum of 10 Pa during 24 h. The absence of charging indicates that the shells are sufficiently conductive to avoid electric charge buildup. This supports the reduction of graphene oxide observed in the x-ray photoelectron spectroscopy analysis; hence the recovery towards graphene electrical properties in isophorone diamine modified graphene oxide. The outer surface of the dried shells is wrinkled and the wrinkles are folds in the sheets. The folds appear brighter in the scanning electron microscope image due to the higher emission of secondary electrons as a result of their higher surface per probing area. Fracturing the shells in liquid nitrogen enables visualization of the layered cross sectional structure of the shells as shown in FIG. 8(B). Sample preparation consisted in depositing an aliquot of the foam on a gold coated silicon support, further drying the sample in a desiccator during 24 h and finally the sample was introduced in liquid nitrogen and fractured. The freeze-fracture bisected some of the graphene shells. The shells in the area of viewing were about 5 nm thick which corresponds to about 4 to 5 sheets.

Transmission electron microscope imaging and diffraction analysis of the shells are shown in FIGS. 8(C) to (B). The transmission electron microscope was operated at 200 kV. Sample preparation consisted in depositing aliquots of the foam on continuous carbon films supported on 200 mesh copper grids. Then samples were dried in a dessicator under a vacuum of 10 Pa during 24 h. Electron diffraction shows evidence of crystallinity arising from the graphene regions in isophorone diamine modified graphene oxide. The diffraction pattern shown in FIG. 8(D) corresponds to the analysis of one of the shell-forming sheets. The pattern observed is the hexagonal single-crystal diffraction pattern of graphene.

Figure 9:
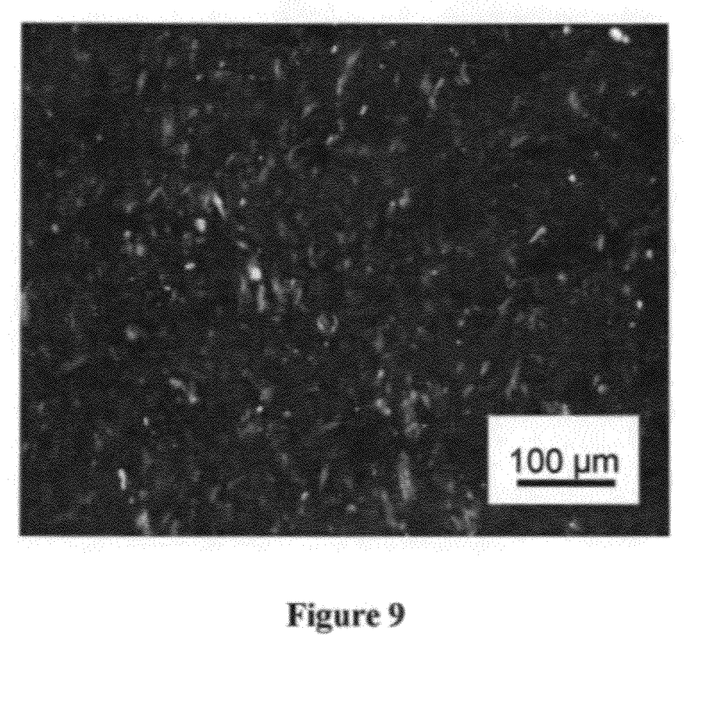
FIG. 9 is a polarized transmission light microscope image of a dispersion of reduced graphene oxide sheets in an epoxy matrix composite.

The liquid foams containing modified graphene oxide can be used to prepare composites. Removal of the foam from the water surface can be done by skimming the foam off or by gravitational separation if the foaming process is conducted in a vessel equipped with a bottom exit. The foams can be mixed with other components in the preparation of polymer formulations, for example, in epoxy formulations that contain isophorone diamine as curing agent. The composition of matter resulting from the mixture of the liquid foam with the other components of the composite formulations can be further dried to remove residual water. During composite processing the foam can be de-aerated, thus removing the air cells and leaving a dispersion of graphene sheets. The foams can be heated during composite processing. FIG. 9 shows an epoxy composite containing reduced graphene oxide sheets dispersed in an epoxy matrix prepared by compounding the epoxy pre-polymer with the liquid foam of graphene. Sample preparation consisted in mixing the foam with isophorone diamine followed by dehydrating the mixture by means of a distillation process. An example of this step follows; 6.4 g of foam were mixed with 25.4 g of isophorone diamine in a glass beaker. Then the mixture was transferred to the round-bottom flask which was connected to the distillation set-up and then immersed in the silicone bath. The mixture was heated following the temperature program shown in Table 3.

TABLE 3

| Time (min.) | Bath Set (° C.) | Bath Actual (° C.) | Distillation Thermometer (° C.) |
|---|---|---|---|
| 0 | 150 | 31 | 23 |
| 10 | 150 | 135 | 23 |
| 20 | 200 | 149 | 100 |
| 30 | 200 | 186 | 100 |
| 40 | 200 | 200 | 100 |
| 50 | 200 | 200 | 70 |
| 60 | 200 | 200 | 50 |

The heating rate was on average 5° C./min from 31° C. to 200° C. The mixture was kept at 200° C. during 20 minutes. After completing the temperature program, the round-bottom flask was removed from the silicone bath. The amount of water in the foam, corresponding to the 390 distilled fraction collected at a distillation temperature of 100° C., was 5.43 g or 85% of the foam in mass. Such preparation corresponds to a loading of 3.8 wt % of isophorone diamine modified graphene oxide sheets in the dehydrated product. The dehydrated product was mixed with the epoxy resin. In the epoxy system used the hardener part contains up to 60% by weight of isophorone diamine as shown in Table 4.

TABLE 4

| Resin Part | Composition | Chemical structure | Mix Ratio | Cure Cycle |
|---|---|---|---|---|
| Araldite LY 5052 epoxy resin | Butanediol diglycidyl ether (15-40 wt %) | | 100 | 1 day at 23° C. followed by 4 h at 100° C. |
| | Epoxy phenol Novolac (40-70 wt %) | | | |

TABLE 4-continued

| Resin Part | Composition | Chemical structure | Mix Ratio | Cure Cycle |
|---|---|---|---|---|
| Aradur 5052 CH mixture of polyamines curing agent | IPDA (30-60 wt %) | | 38 | |
| | Cycloaliphatic diamine (30-60 wt %) | | | |

The following is an example of the steps followed to compound the thermosetting formulation: 1 g of the dehydrated product was placed in a glass vial and then 2.57 g of epoxy resin were added to the vial. Mixing was done with a spatula. The loading of graphene sheets in this particular composite formulation was 1 wt %. Higher concentrations are possible. A vacuum of 10 Pa was applied during 10 minutes to de-aerate the mixture before curing. Curing was conducted following the thermal cycle shown in Table 4. An example of the curing process follows: an aliquot of the mixture was placed between glass slides. The sandwiched liquid resin was left at 23° C. during 24 h. After 24 h, the sample was placed in an oven at 100° C. After 4 hours, the sample was removed from the oven. FIG. 9 shows an image of the resulting composite slab sandwiched between glass slides.

Figure 10:
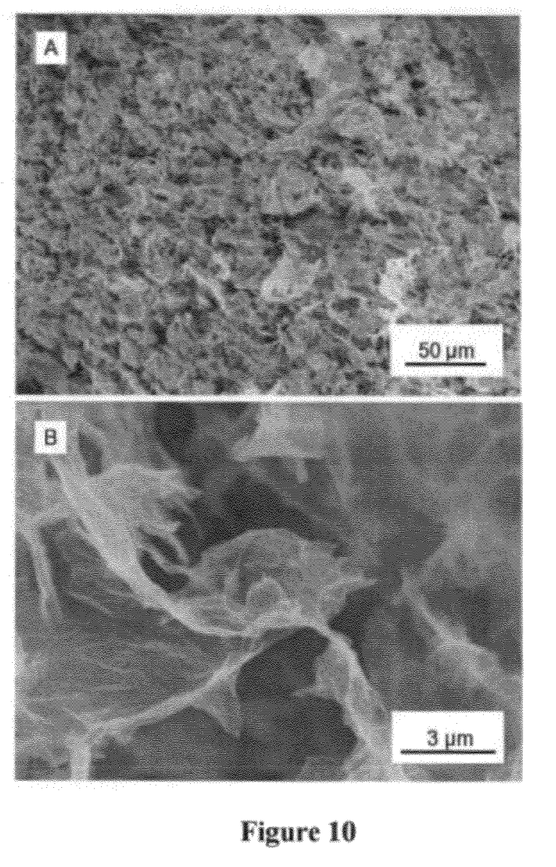
FIG. 10(A) is a scanning electron microscope image of a freeze-dried liquid foam of graphene showing the morphology of the sheets and the high porosity of the structure.
FIG. 10(B) is a higher magnification scanning electron microscope image allowing a closer look at the isophorone diamine modified graphene oxide sheets.

The liquid foam containing modified graphene oxide can also be used to prepare light weight porous materials. FIG. 10 shows a set of scanning electron microscope images of the porous network or open-cell foam made of isophorone diamine modified graphene oxide sheets prepared by freeze-drying the liquid foam. Sample preparation consisted in freezing the liquid foam by immersion in liquid nitrogen followed by drying under vacuum.

Figure 11:
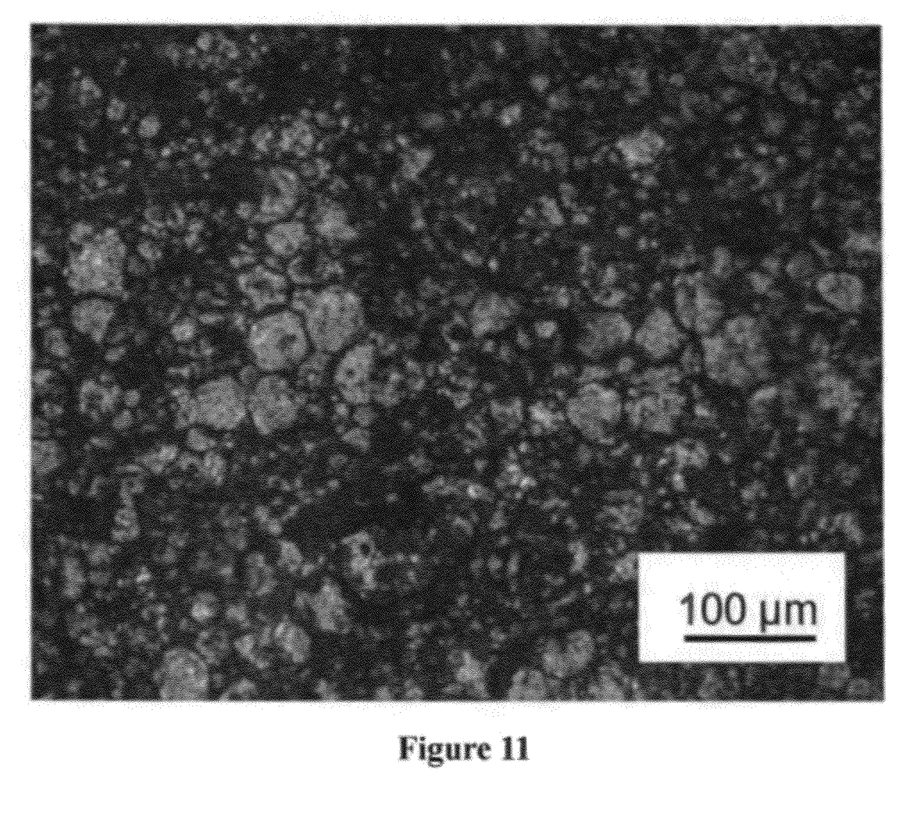
FIG. 11 is a reflection light microscope image of a solid cellular graphene foam coating on a silicon substrate.

Another type of material that can be made from the liquid foam of graphene is a solid graphene foam with closed-cell cellular structure. FIG. 11 shows an image of a solid cellular graphene foam prepared from the liquid foam of graphene. Sample preparation consisted in depositing and drying an aliquot of the liquid foam on a silicon substrate. Upon drying, the graphene shells pack into a closed-cell structure. There is no liquid in between the shells in such solid cellular graphene foams. Considering a shell density ranging from 1 to 3 g/cc, graphite has a density of 2.26 g/cc, the estimated densities of these solid graphene foams would range from 0.002 to 0.006 g/cc for a shell thickness of 5 nm and an average cell diameter of 15 microns. These estimated densities make this solid cellular graphene foam a very low density, ultra-lightweight, material.

Another aspect of the invention is the making of open cell materials. It is well-known that untreated hydrophilic silica particles will aggregate at an air-water interface depending on their concentration. They thereby form a shell around a bubble. Agitating a water-silica phase and entrapping air results in a foam. By addition of hydrophilic silica particles to a water phase containg isophorone diamine-modified graphene oxide and after agitation a foam may be formed that contains surfaces with regions of both silica and graphene sheets. After drying the foam, silica regions may be removed by various treatments, leaving a through-pore in the surface of the shells thus making the structure a 3-dimensional interconnected pore space. This geometry enables one to make superior bicontinuous composites by suitable infiltration of monomers followed by polymerization or, alternatively, by sol-gel infiltration, followed by calcination to make a reduced graphene oxide/ceramic composite with both phases continuous.

EXAMPLE

A suitable open cell foam material can be made by using 5-2000 nm diameter silica nanoparticles synthesized by the standard Stroller process [W. Stober et al. J. Colloid Science, 26(1), 62-69 (1968)]. These particles are synthesized in water of basic pH and may be made directly in the IPDA-GO water solution. Moreover, if made in a separate water solution before combining with IPDA-GO in water solution, water soluble, oligomeric or polymeric molecules may be grafted to the silica surfaces to create a hydrophilic surface coating [S. Simovic and C. Prestidge, Langmuir 19(9), 3785-3792 (2003)] that can later be advantageously fused or reacted to form more stable silica regions within the encapsulating shells. A water solution of the IPDA-modified graphene oxide sheets along with the silica nanoparticles is made. Concentrations of these two types of particles may be varied to subsequently produce solid encapsulating shells comprised of greater or lesser amounts of each component. By increasing the relative volume fraction concentration of the silica nanoparticles, larger regions of the shell will be occupied by the silica. To create an air/liquid foam, the silica, IPDA-GO and water solution is agitated to entrap air bubbles that become stabilized via the surface aggregation of both types of nanoparticles. After formation of these 2 component shells, the material may be treated with a silica etchant, such as by adding ammonia (pH 11) at 50 C [S. H. Liu, Adv. Funct. Mater. 17, 3147-3152 (2007)] to dissolve those silica regions in the shell structure and then the material can be subsequently dried, thus creating an open cell foam.

Additional applications of such graphene foams include Electromagnetic Interference Shielding (EMI Shielding). Such EMI foams since they are conductive offer the ability to absorb EM in a very light weight platform.

The contents of all of the references cited herein are incorporated herein by reference in their entirety.

It is recognized that modifications and variations of the invention will be apparent to those of ordinary skill in the art and it is intended that all such modifications and variations be included within the scope of the appended claims.

What is claimed is:

1. A method for making a liquid foam from graphene comprising:
    preparing an aqueous dispersion of grapheme oxide;
    adding a water miscible compound to the aqueous dispersion of graphene oxide to produce a mixture including a modified form of graphene oxide;
    adding water to the mixture; and
    adding a gas to the mixture to produce a foamed phase including a modified form of graphene oxide.

2. The method of claim 1 wherein the gas is air.

3. The method of claim 1 wherein the adding a gas step comprises agitating the mixture.

4. The method of claim 1 wherein the water miscible compound is a base.

5. The method of claim 4 wherein the base is a diamine.

6. The method of claim 5 wherein the diamine is isophorone diamine.

7. The method of claim 1 wherein the modified form of grapheme oxide is a reduced form of graphene oxide.

8. The method of claim 1 wherein the modified form of graphene oxide is a chemically functionalized form of graphene oxide.

9. The method of claim 1 further including manipulating the liquid foam.

10. The method of claim 9 wherein the manipulation step comprises skimming the liquid foam off the liquid surface.

11. The method of claim 9 wherein the manipulation step comprises a gravitational separation process.

12. The method of claim 1 further including mixing the liquid foam containing a modified form of grapheme oxide with other components to form a composite material.

13. The method of claim 12 wherein one of the other components is a matrix forming component in the composite material.

14. The method of claim 13 wherein the matrix forming component is a polymer or polymer solution or a pre-polymer compound.

15. The method of claim 14 wherein the pro-polymer compound is a component of an epoxy system.

16. The method of claim 13 wherein the matrix foaming component is a sol-gel ceramic precursor.

17. The method of claim 1 further including using the liquid foam to produce a porous material or open-cell foam made with a modified form of graphene oxide.

18. The method of claim 17 wherein the modified form of grapheme oxide is a reduced form of graphene oxide.

19. The method of claim 17 wherein the modified form of graphene oxide is a chemically functionalized form of graphene oxide.

20. The method of claim 1 further including drying the liquid foam to form a solid foam.

21. The method of claim 20 wherein the solid foam has a closed-cell cellular structure.

22. The method of claim 20 wherein the gas cells in the solid foam are encapsulated inside graphene shells made of a modified form of graphene oxide.

* * * * *